Dec. 8, 1964
C. T. BRANDT ET AL
3,159,976
SEALING OF POROUS AND FISSURED FORMATIONS
WITH CATIONIC ASPHALT EMULSIONS
Filed Dec. 27, 1960
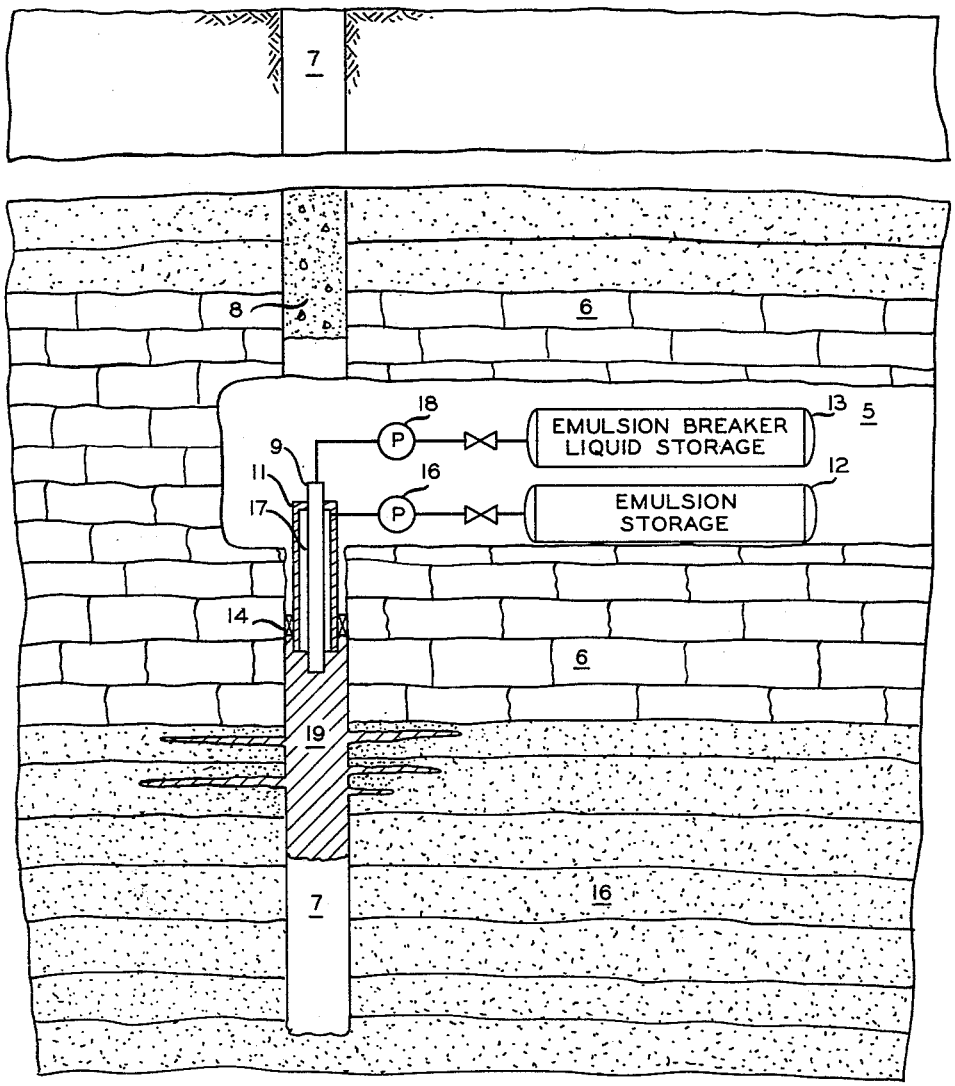
INVENTORS
W. R. BOWLES
C. T. BRANDT
BY Hudson & Young
ATTORNEYS

United States Patent Office 3,159,976
Patented Dec. 8, 1964

3,159,976
SEALING OF POROUS AND FISSURED FORMATIONS WITH CATIONIC ASPHALT EMULSIONS
Carl T. Brandt and William R. Bowles, Bartlesville, Okla., assignors to Phillips Petroleum Company, a corporation of Delaware
Filed Dec. 27, 1960, Ser. No. 78,695
6 Claims. (Cl. 61—36)

This invention relates to a method of decreasing the permeability of fissured and porous formations. In another aspect it relates to the injection of an asphalt emulsion and an emulsion breaking liquid into a well bore in a particular order, to effect a quick emulsion break once the asphalt is in situ, thereby plugging off the man-made hole from the immediate porous or fissured area surrounding it.

It is well known to inject asphalt emulsions into loose or porous formations, such as sands and shales, either to consolidate them or impermeabilize them, or both. It is, of course, necessary that these emulsions first travel to the area to be plugged, and thereafter "break." Various combinations of the emulsion with a coagulant, or the subsequent addition of a second liquid to trigger the precipitation of the asphalt emulsion, have been disclosed. However, there are particular situations, such as where voluminous rates of flow of underground water in large crevices are encountered, in which present precipitating methods have proven too wasteful of the emulsion. This is because of a time lag between the emulsion reaching the area and the formation of the precipitate. This lag permits much of the emulsion to be carried away by the sizable water flow, before it can attach itself to the soil particles, and permit significant plugging of highly porous areas to occur.

We have discovered that when an asphalt, which has been emulsified with a cationic emulsifier, is injected into a porous area, concurrently with a second emulsion-breaking liquid, but through separate conduits, wherein the second liquid and the slightly acidic emulsion first make contact in the formation, this causes a quick break of the emulsion, with ready coalescence of the asphalt particles and their adherence to the soil. This greatly facilitates the impermeabilizing of the fissured area with minimal expenditure of emulsion.

The second liquid is preferably a strong base, such as lime water, although other hydroxides should be suitable. In certain instances, it will be found that the ground water encountered may be of a character to cause the asphalt emulsion to break without concurrent addition of base.

It is, therefore, an object of this invention to provide an improved process for decreasing the permeability of highly porous formations penetrated by well bores.

It is another object for plugging off large crevices and fissures in formations penetrated by boreholes.

It is a further object to provide for a method of a quick break in the asphalt emulsion upon reaching the area to be plugged.

Other objects, advantages and features of this invention will become apparent to those skilled in the art without departing from the scope and spirit of this invention and it should be understood that the latter is not necessarily limited to the aforementioned discussion.

To accomplish the objects of our invention there is provided for grouting, for example, a cationic asphalt emulsion comprising: 65 parts by weight of asphalt; and 34.4 parts of relatively pure water. An asphalt-in-water emulsion was formed of these components by the use of an emulsifier further comprising 0.5 weight percent of the emulsion, the emulsifier being the HCl addition product of a cation, surface-active agent, specifically tallow diamine hydrochloride. The emulsion is probably slightly acidified by the remainder of the hydrochloric acid, which did not combine with the surfactant. The formation of the emulsion in the colloid mill is promoted by the addition of about 0.1 weight percent calcium chloride.

Referring now to the drawing in which is shown a typical underground formation to which the instant invention may be applied, a horizontal mine drift 5 located in a strata of shale 6 extends from a main mine shaft (not shown). Drift 5 intercepts a core hole 7 which has been plugged with cement 8, but not down to the depth of drift 5. Two concentric tubings 9 and 11 are set in the floor of drift 5 extending down, through open core hole 7. The cationic asphalt emulsion and the emulsion breaker liquid are stored in tanks 12 and 13, respectively. A rubber packer 14 is initially set in shale formation 6 below drift 5 to slow the producing of formation water from a Sandstone formation via core hole 7 to drift 5.

Emulsion is drawn from tank 12 by pump 16 and injected through annulus 17 into core hole 7 below the floor of drift 5. Concurrently, emulsion breaker liquid is drawn from tank 13 by pump 18 through inner tube 9 which terminates in close proximity to outer tubing 11. Upon contact of the two injected liquids, the emulsion breaks, quickly forming an asphalt plug 19 which essentially fills core hole 7, and flows into the fissures and crevices in the formation adjacent the core hole. In this manner the flow of ground water from formation 16 up through lower core hole 7 and around packer 14 is substantially terminated.

In certain formations, the ground water will be of such a character as to be able to break the injected asphalt emulsion upon contacting the same, thus omitting the need for concurrent injection of an emulsion breaker. Whether this condition exists can be readily determined by taking samples of the produced ground water and contacting them intimately with the prepared asphalt emulsion for short periods of time. If a quick break and agglomeration of the asphalt occurs, the emulsion may be injected alone into the formation. The inner tubing 9 can be withdrawn or left in place, as preferred, and the emulsion alone pumped down tubing 11 or annulus 17 to a level where it will promptly contact ground water. An asphalt plug will form just as in the first procedure.

In grouting operations, the prepared emulsion may be temporarily stored at the site, provided it is maintained under non-freezing conditions, along with the emulsion breaking liquid. The breaking liquid will first contact the emulsion in the porous or fissured formation. A detailed description of a typical grouting operation is found in the example.

The asphalt employed in this invention may be any asphalt which has been determined by methods well known to those skilled in the art as being suitable for road paving. It has been found that asphalts, having a penetration at 25° C. of from 85 to 300, are suitable for forming the emulsion employed in this invention. For the penetration range described above, heating at about 250°–300° F. will provide a hot liquid asphalt suited to be fed to a colloid mill for the combination and emulsification therein. The asphalt content of the final emulsion will range between 60 and 70 parts by weight.

The formation of an asphalt-in-water emulsion is greatly facilitated by the use of an acid addition product of a cation, surface-active compound as an emulsifying agent. The role of surface-active compounds in diminishing the surface tension of water when present in small amounts is well known in the art. Among the cation-active organic compounds found particularly suitable to make the addition product that comprises the emulsifier were the N-alkyl trimethylene diamines, derived from coconut, soya and tallow fatty acids, marketed as the Duomeens by Armour and Company. Particularly useful as a surfactant for forming the asphalt emulsifier is Duomeen T, the tallow diamine. Another particularly useful reactant is 1-(2-aminoethyl)-2-alkyl-2-imidiazolines, also marketed by the Nalco Chemical Company, as Nalcamine G-39-M.

These organic surfactants should be used in concentrations of at least 0.2 weight percent, based on the emulsion, to assure satisfactory emulsification, ranging up to about 1.0 percent, depending upon the type of emulsion made. A preferable range is about 0.2 percent to 0.5 percent, which will assure proper emulsification, while providing for proper economy in the use of the surfactant.

The combination of a small percentage of a mineral or simple organic acid with the surfactant is necessary to form an addition product that comprises the emulsifying agent. Almost any acid, such as acetic, hydrochloric, or sulfuric have been found suitable for this purpose. The amount of acid used will be in a weight ratio of approximately 1:2 to the organic surfactant, or about 0.1 to 0.25 weight percent. The resulting addition product is a tallow diamine hydrochloride, 1-(2-aminoethyl)-alkyl-2-imidiazolines hydrochloride, or other mineral acid derivatives, which will satisfactorily emulsify asphalt.

It has been found that the presence of a small amount of calcium chloride provides an emulsion of more acceptable quality. The exact mechanism by which this is achieved is not known, but the emulsion forms more readily, and the viscosity thereof appears to be regulatable by varying the concentration of the calcium chloride. From about 0.1 to 0.25 weight percent of this emulsion "promoter," based on the emulsion, yields a satisfactory emulsion having a viscosity suitable for injection into a formation.

The aqueous phase is conveniently ordinary water, such as would be supplied commercially. However, a low solids content water is preferable. Formation water, which is relatively solids free, is also suitable. The continuous water phase will range from 39 to 29 parts by weight of the final emulsion.

The cation asphalt emulsion of this invention may be reinforced by the use of various bulking materials, such as cotton seed hulls, cellophane, red wood shavings, and other materials commonly used for bulking purposes in sealing lost circulation zones in oil wells. There is a material advantage is incorporating these bulking materials into the emulsion, where unusually large fissures or high ground water flow rates are experienced to seal off such openings.

The ingredients of the asphalt emulsion may be admixed in almost any order, and a useful emulsion will result. A superior composition will be produced, however, if a certain procedure is followed. The asphalt emulsion is preferably prepared in the following manner.

The acid is dissolved in the water phase. Next, the surfactant is dissolved in the acid solution. Finally, the calcium chloride is dispersed in the solution, which is then heated in the range 100-140° F. Separately, the asphalt is heated in the range 250-300° F. to give a hot liquid asphalt. The aqueous solution and the hot asphalt are proportioned to a colloid mill to emulsify the same. The resulting emulsion is then cooled to below 150° F. before being transferred to a storage vessel.

The emulsoin breaking solution comprises an alkali metal or alkaline earth metal hydroxide in a water solution. Economics of a particular location will dictate the choice of the hydroxide. The use of such a liquid is critical to insure not only a quick break of the emulsion in situ, but the agglomeration of the freed asphalt particles into a continuous mass. It is known that the emulsion will break with the passage of time, however, the losses of emulsion in this manner are intolerable from an economic point of view. Moreover, in an area of high water flow rate the emulsion will be washed away before it has any opportunity to break and coalesce, if time alone were relied upon.

Special experience has been gained with the use of lime water as the emulsion breaking liquid, although the choice is clearly not limited thereto. Commercial quick lime (calcium oxide) or commercial slaked lime (calcium hydroxide) are diluted with water. As saturated lime water contains about 1.29 grams of calcium oxide per liter of water, batches of lime water were made up at the site from about 4 pounds of quick lime to each 250 gallons of water. Minor variations in the degree of saturation are ont significant, provided a good dispersion of the lime is maintained in the breaking liquid prior to the contacting of the emulsion in situ. Alternatively, the amount of slaked lime required to achieve saturation can be readily calculated, and mixed in the appropriate amount of water to give the indicated calcium oxide concentration.

The reason for the emulsion breaking nature of the lime water is not clearly understood. One possible explanation is that the breaker liquid interferes with the emulsifying function of the emulsifier, e.g., the tallow diamine hydrochloric acid complex, perhaps by breaking down the complex. Thus, it can no longer retain the asphalt as the discontinuous phase, with a resultant sudden break. Whatever the precise mechanism, the breaking of such an asphalt emulsion in situ and successful plugging of a water producing formation has been achieved and is described in the example.

*Example*

The method of the instant invention was applied successfully in the Church Rock Mine in McKinley County, New Mexico. In developing a horizontal drift in the Brushy Basin shale from the 490 foot level of a main shaft, a core hole was intercepted which had not previously been plugged to its full depth. When first intercepted, the core hole was making somewhat in excess of 100 gallons of water per minute from a lower Westwater Sandstone formation into the drift. The produced water ran along the bottom of the tunnel back to the main shaft several hundred feet away, thus impeding mining operations.

In an attempt to control this troublesome water flow, a rubber packer had been set in the Brushy Basin shale below the floor of the drift. As the shale formation lacked sufficient strength, the water continued to wash out around the set packer at a very substantial and unacceptable rate, which stabilized at around 50 to 55 gallons per minute. Shutting off of this water flow with a packer was considered a failure.

Next, two concentric tubes, one of 2 inches in diameter and the other ½ inch in diameter, were run through the packer to extend some distance below the packer. The cationic asphalt emulsion and the emulsion breaking liquid were prepared as previously described. The two liquids were placed in storage tanks located in the drift itself, near the intersected core hole. The asphalt emulsion tank was piped to the annulus of the two concentric pipes, while the lime water tank was piped to the inner of the two tubings. Positive displacement pumps of suitable capacity were placed in each of the liquid feed lines. It had been determined previously by contacting samples of the formation water with samples of emulsion that it was not of a character such that, by itself it would break the emulsion upon contacting the same.

At start up, both the grout pump and the lime water pump were operated simultaneously. The emulsion was pumped in at a rate ranging between 25 and 30 gallons per minute, while the lime water was pumped in at a rate ranging between 5 and 10 gallons per minute. During a temporary air lock in the grout pump, the lime water pump was shut down, while the former was being bled off. When the pumping of the emulsion was resumed, a temporary difficulty was experienced with starting up the lime water pump. Thus, several gallons of emulsion circulated to the surface until the lime water again reached the formation concurrently. This confirmed the supposition that the injection of the liquids must be concurrent in order to get a quick break and achieve rapid plugging. Subsequently, a build up of back pressure to about 150 p.s.i.g. occurred, and almost instantaneous plugging was obtained.

Several days later, a check showed that the asphalt plug was still holding. There might have been minor seepage around the plug from the lower Westwater Sandstone formation, but it was too small to be detected or measured.

Though it was felt that the materials and method used in this particular grouting operation had considerable merit and unquestioned success, there were a number of precautions that were decided upon for this method of grouting to be successful in even more difficult situations. The equipment used should be in excellent operating condition, and both the lime and asphalt emulsion pumps should be capable of developing a minimum head of a 150 p.s.i. above the hydrostatic head anticipated in the formation. Additionally, a means of skimming off or catching any asphalt emulsion that might be stirred or circulated back into the drift should be provided, in order to prevent carry over of this material into the water pumps. It would be desirable to provide a screening device for the asphalt emulsion to make certain that no partially broken asphalt is carried into the grout pump. Also, the equipment should be kept as compact as possible, and a means provided for flushing and cleaning equipment at the site immediately upon completion of the grouting operation. Finally, where large rates of water flow exist and/or large crevices or channels are encountered, it is felt that the described method of dual injection of emulsion and emulsion breaker to instantaneously form a plastic material in situ will be almost essential for economic success.

The back pressure which will indicate when to shut off injection of the liquids for a particular formation and depth of grouting is determined as described below. It is well known in the art that the formation pressure at a given level underground will be the sum of the flowing pressure of the injected material plus the static head down to that level less the friction pressure loss due to the flow of the injected fluid through the tubings. For the purposes of this invention it will be sufficient to establish this selected pressure by computing a pressure which ranges between 0.5 and 1.5 pounds per square inch gauge for each foot of depth of said level of grouting below the surface. This rule of thumb will preclude false signals as to when a solid plug has been achieved.

Among the applications contemplated for use with the composition and impermeabilizing method of this invention are the grouting of water bearing crevices that intersect a mine shaft. When the probable major fractures surrounding such a shaft have been located, by methods well known in the art, injection of the emulsion can be made through holes drilled to intersect these crevices. The breaking of the emulsion would be carried out as described in the example. If all of the major water producing crevices are intercepted and successfully plugged, a substantial shutting off of water flow from the formation into the mine shaft will be achieved.

Various modifications and alterations of this invention will become apparent to those skilled in the art without departing from the spirit and scope of the invention thereof.

We claim:

1. A method for decreasing the permeability of a porous formation penetrated by a bore hole comprising: injecting a cationic asphalt emulsion which comprises about 60–70 parts by weight of particulate asphalt, about 29–39 parts by weight of water, about 0.3–1.5 parts by weight of acid addition product of a cation surface-active agent employed as an emulsifier, and about 0.1 to 0.25 part by weight of calcium chloride into one area of said formation through a first conduit depending within said bore hole; concurrently injecting an aqueous solution of a metal hydroxide into said formation through a second conduit depending within said bore hole in an amount sufficient to break said emulsion upon contact; and continuing said concurrent injection into said formation until the back pressure on said first conduit achieves a preselected level, said level is such as to produce a formation pressure at the level of grouting which ranges from 0.5 to 1.5 pounds per square inch gauge for each foot of depth of said grouting level below the surface.

2. The method of claim 1 wherein said first conduit annularly and spacedly surrounds said second conduit and terminates at its lower end portion at a point above the lower end portion of said second conduit.

3. The method of claim 1 wherein said emulsifier is selected from the group consisting of tallow diamine hydrochloride and 1-(2-aminoethyl)-2-alkyl-2-imidiazolines hydrochloride.

4. A method for decreasing the water permeability of a pervious sand comprising injecting a cationic asphalt emulsion which comprises about 60–70 parts by weight of particulate asphalt, about 29–39 parts by weight of water, about 0.3–1.5 parts by weight of acid addition product of a cation surface-active agent employed as an emulsifier, and about 0.1 to 0.25 part by weight of calcium chloride into one area of said formation through a first conduit depending within a bore hole, concurrently injecting an aqueous solution comprising a metal hydroxide into said formation through a second conduit depending within said bore hole, the volume of said aqueous solution approximating the volume of said injected emulsion, and injecting an additional volume of said emulsion into said formation until the back pressure on said first conduit achieves a preselected level, said level is such as to produce a formation pressure at the level of grouting which ranges from 0.5 to 1.5 pounds per square inch gauge for each foot of depth of said grouting level below the surface.

5. A method for sealing off one drift of a mine intersected by a bore hole making underground water to said drift comprising: setting first and second concentric conduits in said bore hole; setting a packer in the annulus between the outer of said conduits and the walls of said bore hole at a point just above an area to be impermeabilized; injecting a cationic asphalt emulsion which comprises about 60–70 parts by weight of particulate asphalt, about 29–30 parts by weight of water, about 0.3–1.5 parts by weight of acid addition product of a cation surface-active agent employed as an emulsifier, and about 0.1 to 0.25 part by weight of calcium chloride through said first conduit and past said packer into said area; concurrently injecting an aqueous solution comprising an alkali metal hydroxide into said formation through said second conduit and past said packer into said area, in an amount sufficient to break said emulsion upon contact; and continuing said concurrent injection into said area until the back pressure on said first conduit achieves a preselected level, said level is such as to produce a formation pressure at the level of grouting which ranges from 0.5 to 1.5 pounds per square inch gauge for each foot of depth of said grouting level below the surface.

6. The method of claim 5 wherein said first conduit annularly and spacedly surrounds said second conduit and terminates at its lower end portion at a point above the lower end portion of said second conduit.

References Cited in the file of this patent

UNITED STATES PATENTS

| | | |
|---|---|---|
| 2,201,459 | Hulst | May 21, 1940 |
| 2,378,235 | Miles | June 12, 1945 |
| 2,761,511 | Billue | Sept. 4, 1956 |